United States Patent
Adachi et al.

(10) Patent No.: US 6,281,786 B1
(45) Date of Patent: Aug. 28, 2001

(54) OBSTACLE DETECTION SYSTEM FOR A VEHICLE

(75) Inventors: Kenichi Adachi, Hikone; Naoya Azuma, Otsu, both of (JP)

(73) Assignee: Matsushita Electric Works, Ltd., Osaka (JP)

(*) Notice: Subject to any disclaimer, the term of this patent is extended or adjusted under 35 U.S.C. 154(b) by 0 days.

(21) Appl. No.: 09/293,961

(22) Filed: Apr. 19, 1999

(30) Foreign Application Priority Data

Apr. 20, 1998 (JP) .................................................. 10-109282

(51) Int. Cl.⁷ ...................................................... B60Q 1/00
(52) U.S. Cl. .......................... 340/435; 340/903; 340/943; 367/909
(58) Field of Search ..................................... 340/903, 435, 340/943, 904, 460; 342/70, 85, 87, 99; 367/99, 909

(56) References Cited

U.S. PATENT DOCUMENTS

| | | | |
|---|---|---|---|
| 4,467,313 | * 8/1984 | Yoshino et al. | 340/903 |
| 5,347,273 | * 9/1994 | Katiraie | 340/903 |
| 5,530,651 | 6/1996 | Uemura et al. | 340/435 |
| 5,594,413 | * 1/1997 | Cho et al. | 340/903 |
| 5,714,928 | * 2/1998 | Sudo et al. | 340/903 |
| 5,717,399 | 2/1998 | Urabe et al. | 342/70 |
| 5,831,717 | * 11/1998 | Ikebuchi | 340/942 |
| 5,872,508 | * 2/1999 | Taoka | 340/436 |
| 5,940,011 | * 8/1999 | Agravante et al. | 340/903 |

FOREIGN PATENT DOCUMENTS 2309555    7/1997  (GB) .

* cited by examiner

*Primary Examiner*—Brent A. Swarthout
(74) *Attorney, Agent, or Firm*—Greenblum & Bernstein, P.L.C.

(57) ABSTRACT

An obstacle detection system for a vehicle which is capable of detecting nearby and remote objects successfully by use of a combination of an electromagnetic wave sensors and ultrasonic wave sensors. The system of the present invention includes a plurality of ultrasonic wave sensors each transmitting an ultrasonic wave around the vehicle and receives a reflected wave thereof for detection of nearby obstacles around the vehicle, and an electromagnetic waver sensor which transmits an electromagnetic wave in a forward direction of the vehicle and receives a reflected electromagnetic wave thereof for detection of a remote obstacle. The system includes a vehicle speed sensor is provided for sensing a speed of the vehicle. A detection unit detects a presence of the nearby obstacle based upon the reflected ultrasonic wave when the vehicle speed equals to a predetermined reference speed or less, and detects a position of the remote obstacle relative to the vehicle only based upon the reflected electromagnetic wave when the vehicle speed exceeds the reference speed. The detection unit issues a nearby signal upon detection of the nearby obstacle and issues a remote signal when the position of the remote obstacle is within a predetermined long distance from the vehicle. A warning unit gives warnings respectively in response to the nearby and remote signals.

7 Claims, 3 Drawing Sheets

OBSTACLE DETECTION SYSTEM FOR A VEHICLE

BACKGROUND OF THE INVENTION

1. Field of the Invention

The present invention is directed to an obstacle detection system for a vehicle.

2. Description of the Prior Art

U.S. Pat. No. 5,717,399 discloses an obstacle detection system for vehicle use which utilizes a plurality of electromagnetic antennas for transmitting FM radio waves and receiving reflected radio waves for detection of nearby objects as well as remote objects in order to cover a wide detection range. In view of the known fact that the electromagnetic antenna has only insufficient detection capability for detection of nearby objects, particularly due to its narrow directivity, it is necessary to provide a plurality of the electromagnetic antennas within a single radar module for covering a wide detection angle for the nearby object as contemplated in the above patent, or to add a scanning mechanism to the single electromagnetic antenna for covering the wide detection angle. However, this involves additional and complex circuit configurations or mechanical structures with attendant cost increase for manufacture of the system. Further, when the plurality of the differently oriented electromagnetic antennas are combined into the one radar module for detection of the nearby objects over a wide angular detection zone, the individual antennas have to be activated sequentially to monitor individual areas one by one within the detection zone. However, there is always a problem with this detection method that the nearby object is only detected at the last of the sequence, causing a delay in detection response.

SUMMARY OF THE INVENTION

The present invention has been accomplished in view of the above problems to provide an improved obstacle detection system for a vehicle which is capable of detecting nearby and remote objects successfully by use of a combination of electromagnetic wave and ultrasonic wave sensors. The system of the present invention includes a plurality of the ultrasonic wave sensors each of which transmits an ultrasonic wave around the vehicle and receives a reflected ultrasonic wave thereof for detection of nearby obstacles around the vehicle, and an electromagnetic wave sensor which transmits an electromagnetic wave in a forward direction of the vehicle and receives a reflected electromagnetic wave thereof for detection of the remote obstacle. The system includes a vehicle speed sensor is provided for sensing a speed of the vehicle and provides a speed output indicative thereof. Also included in the system is a detection unit which detects a presence of the nearby obstacle based upon the reflected ultrasonic wave when the speed output is not more than a predetermined reference speed, and detects a position of the remote obstacle relative to the vehicle only based upon the reflected electromagnetic wave when the speed output exceeds the reference speed. The detection unit issues a nearby signal upon detection of the nearby obstacle and issues a remote signal when the position of the remote obstacle is within a predetermined long distance from the vehicle. A warning unit is also provided to give warnings respectively in response to the nearby and remote signals. Thus, the system utilizes the ultrasonic sensor which is known to have good sensitivity for detection of the nearby obstacle and the electromagnetic sensor known to have good sensitivity for detection of the remote obstacle, thereby covering a wide detection range with sufficient and reliable sensitivity and with a simple circuit configuration.

Preferably, the detection unit is configured to shorten the predetermined long distance for narrowing a detection range of the remote obstacle as the speed output is lowered, thereby eliminating unnecessary detection of a far remote obstacle when the vehicle is traveling at a relatively low speed.

The system is also preferred to include a direction sensor which provides a steering wheel angle of the vehicle so that the electromagnetic wave sensor varies its wave transmission direction or directivity depending upon the steering wheel angle for reliable detection of the remote obstacle located in an actual course that the vehicle is intended to proceed.

Further, the system may includes a rear electromagnetic wave sensor unit which transmits an electromagnetic wave in a rearward direction of the vehicle and receives a reflected electromagnetic wave thereof for detecting a remote obstacle behind the vehicle. The detection unit processes the reflected electromagnetic wave from the rear electromagnetic wave sensor to detect a position of the remote obstacle behind the vehicle and to discriminate the remote obstacle as another vehicle approaching from behind when the position of the remote obstacle is found to become closer to the vehicle and to issue a catching-up signal indicative of the presence of the catching-up vehicle. The warning unit responds to the catching-up signal for generating a warning for assuring a safe driving.

The warning unit may comprise a buzzer generating an intermittent buzzing sound of which interval and/or frequency varies according to the detection of the nearby and remote obstacles.

Alternatively, the warning unit may comprise a voice speaker which generates a voice message for the detection of the nearby and remote obstacles.

These and still other objects and advantageous features of the present invention will become more apparent from the following description of the preferred embodiment of the present invention when taken in conjunction with the attached drawings.

DETAILED DESCRIPTION OF THE PREFERRED EMBODIMENT

Figure 1:
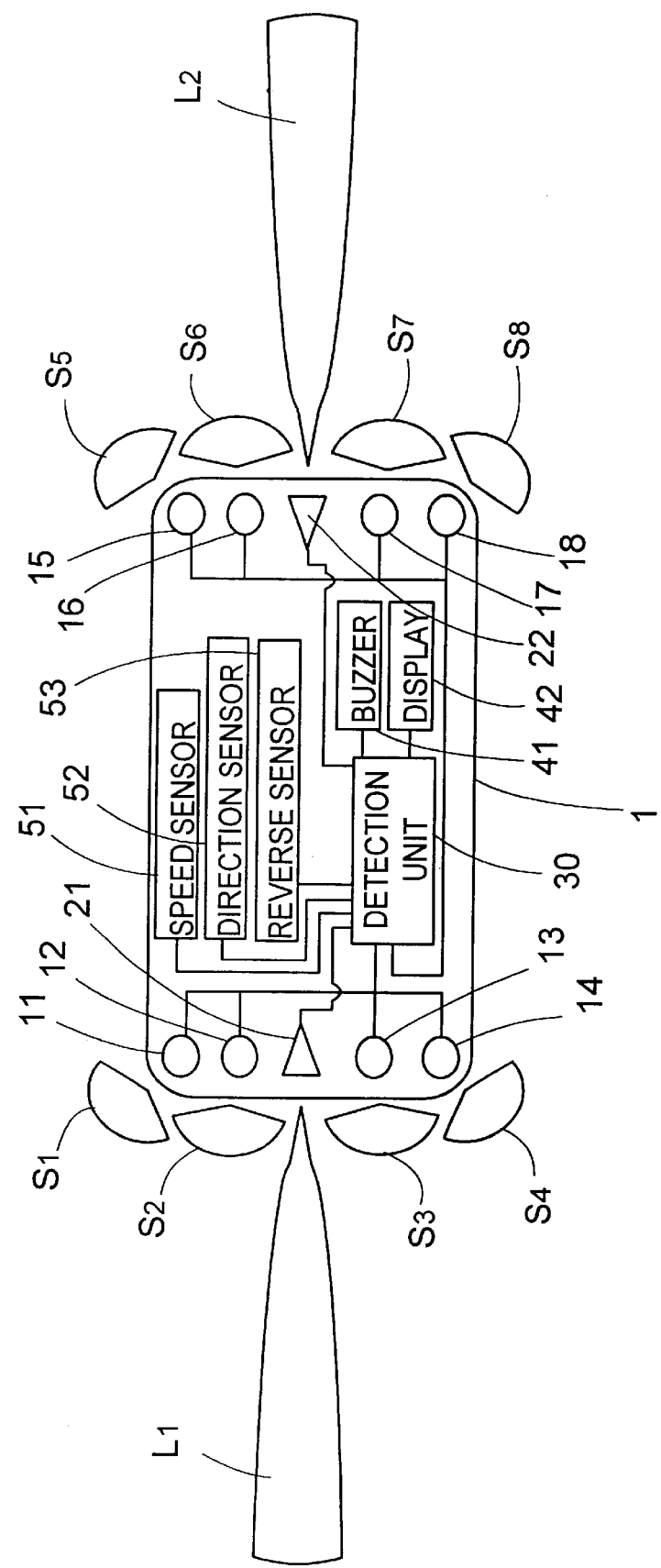
FIG. 1 is a block diagram illustrating an obstacle detection system for a vehicle in accordance with a preferred embodiment of the present invention.
Figure 2:
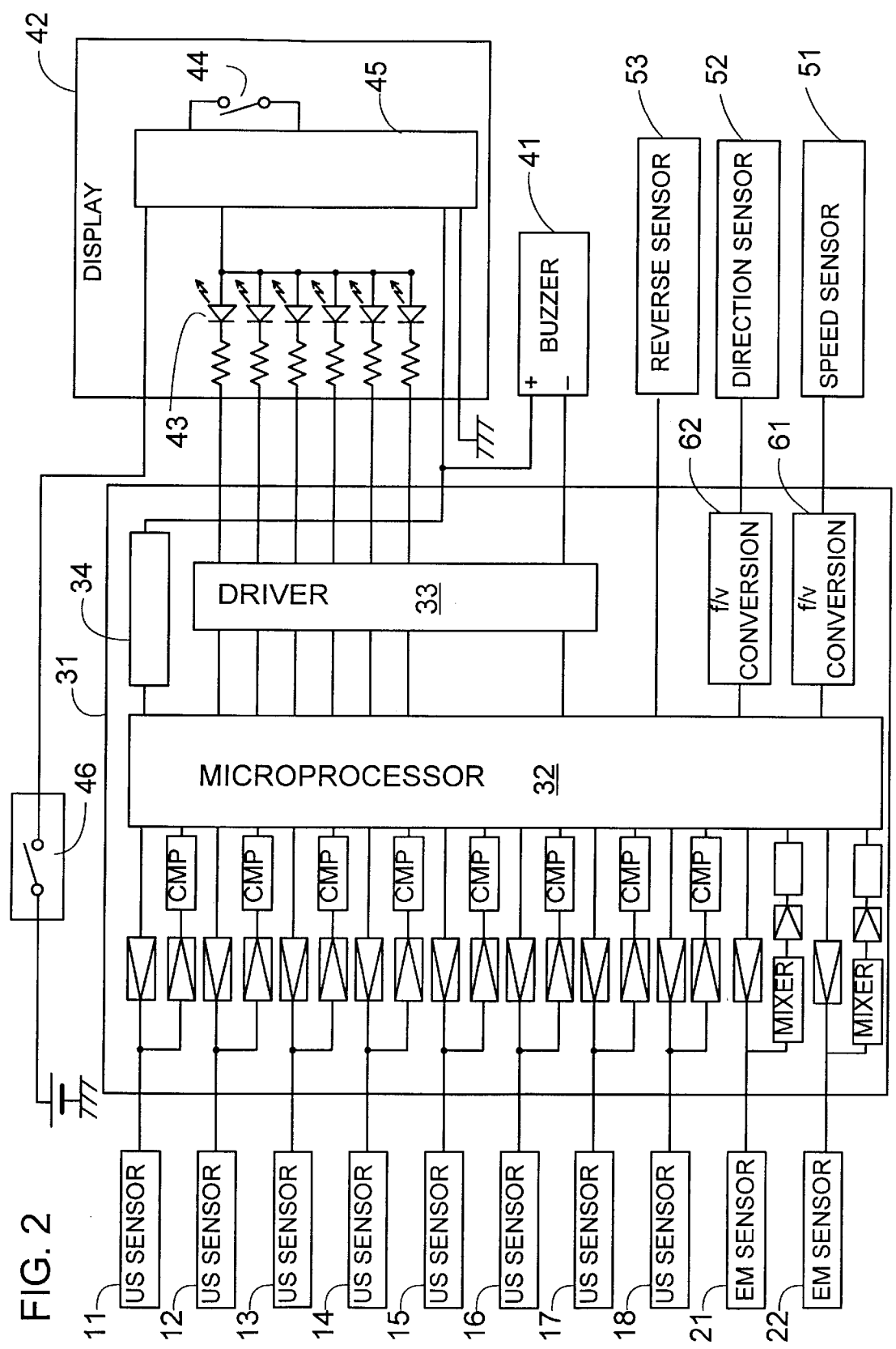
FIG. 2 is a more detailed diagram of the above system.

Referring now to FIG. 1, there is shown an obstacle detection system for a vehicle in accordance with a preferred embodiment of the present invention. The system is adapted in use to be mounted on a vehicle 1 and comprises a plurality of ultrasonic wave sensors (hereinafter referred to simply as US sensors) 11 to 18 and two electromagnetic wave sensors (hereinafter referred to simply as EM sensors) 21 and 22. Four US sensors 11 to 14 are mounted on the front of the vehicle 1 and spaced along the width thereof, while the remaining four US sensors 15 to 18 are mounted on the rear of the vehicle 1. Each of US sensors 11 to 18 transmits an ultrasonic wave pulse and receives a reflected ultrasonic wave pulse back from a target or obstacle, if any, around the vehicle to detect and locate the obstacle in a known manner. Due to detection characteristic of the US sensor, each US sensor gives a short detection range S1 to S8 with a relatively wide directivity around the vehicle for detection of a nearby obstacle. The detection and/or position of the obstacle is acknowledged at a detection unit 30 which is realized in an electronic control unit (ECU) 31 with a microprocessor 32, as shown in FIG. 2.

The EM sensors 21 and 22 are mounted at the front center and rear center of the vehicle 1, respectively for monitoring forward and rearward fields of view from the vehicle 1. Each of EM sensors 21 and 22 transmits an electromagnetic wave in a millimeter wave band, for example, 24 GHz and 76–77 GHz as an FM signal and receives a reflected FM signal from an obstacle, if any, at a remote distance from the vehicle to detect and located the obstacle in a known manner. Each of the front and rear EM sensors gives a long detection range L1 and L2 with a relatively narrow directivity for detection of a remote obstacle ahead and behind the vehicle. The position of the obstacle is determined at the same detection unit 30 based upon a frequency shifting between the transmitted and reflected FM signals, as is known in a radar detection system relying on an FWCW (frequency modulation continuous wave) process. It is equally possible to use the electromagnetic wave in a micrometer wave band.

The system includes a speed sensor 51 for deriving a vehicle speed and a direction sensor 52 in the form of a steering wheel angle sensor for obtaining a direction of the vehicle to follow. Further, a reverse sensor 53 is provided for detection of a rearward movement of the vehicle 1. Speed direction outputs from sensors 51 and 52 are fed respectively through a frequency-voltage conversion section 61 and 62 to the microprocessor 32. Based upon the outputs from the sensors 51 to 53, the microprocessor 32 controls the operation of the system as discussed later. A buzzer 41 and a display 42 are connected to the microprocessor 32 to constitute a warning unit for providing warnings to a driver based upon the detection of the nearby and remote obstacles. The buzzer 41 generates an intermittent buzzing sound of variable frequency (f1, f2) and intervals (T1, T2) for easy recognition by the driver as to which of the nearby or remote obstacle is detected. That is, the buzzer 41 gives off the buzzing sound of a low frequency (f1) with long intervals (T1) upon detection of the nearby obstacle at the detection unit 30, while the buzzer 41 gives off the buzzing sound of a high frequency (f2) with a short intervals (T2) upon detection of the remote obstacle. When both of the nearby and remote obstacles are detected at a particular condition as discussed later, the buzzing sound of the above two kinds are issued alternately.

The display 42 comprises a plurality of LEDs 43 which are arranged around a vehicle figure provided in a dashboard of the vehicle 1 to represent actual positions, i.e., front center, front left, front right, rear center, rear left, and rear right of the vehicle. The LEDs are connected to the microprocessor 32 through a driver 33 so that one or more of the LEDs corresponding to the detection range defined by the US sensors and EM sensors is turned on for immediate recognition by the driver of in which direction the nearby and/or remote obstacle is detected. The display 42 includes a selection switch 44 which deactivates the display as necessary. Further, the display 41 includes a power source 45 which provides a stabilized operation voltage to a voltage source 34 of microprocessor 32 and LEDs 43 from a battery on the vehicle. A power switch 46 is provided between the battery and the power source 45 for energizing and deenergizing the system. Instead of or in addition to the buzzer 41 and display 42, a voice speaker may be incorporated to inform the driver of the detection of the nearby and/or remote obstacle by suitable voice warning messages, for example, "Caution!, nearby obstacle detected in front center" and the like.

Figure 3:
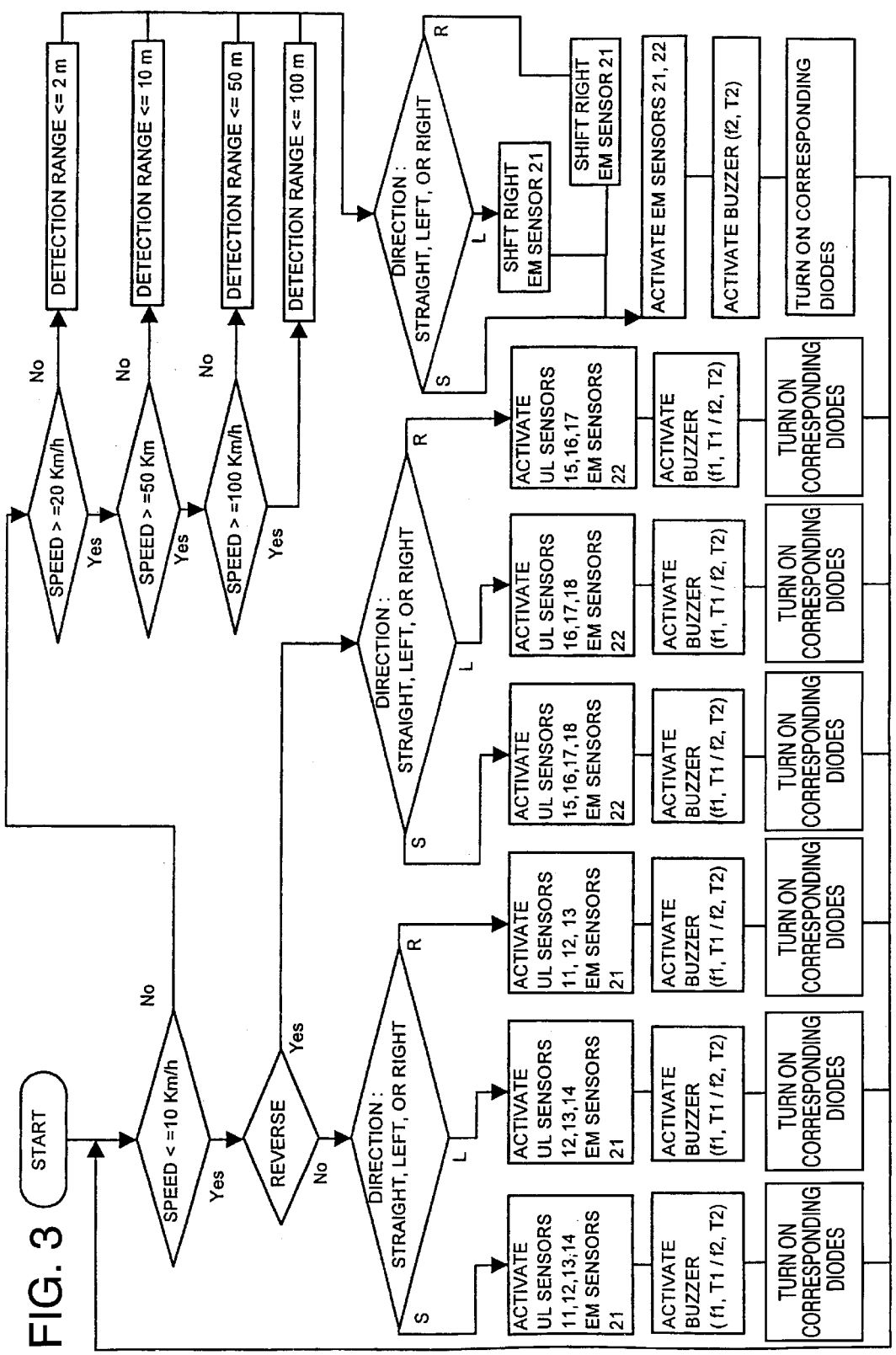
FIG. 3 is a flow chart illustrating the operation of the above system.

The microprocessor 32 is programmed to execute the operation as shown in the flow chart of FIG. 3. When the monitored vehicle speed is 10 km/h or under, a control is made to check whether the vehicle is moving forward or rearward. When the vehicle is moving forward, then the direction of the vehicle is checked to perform respective routines as indicated. That is, when the vehicle is moving straight forward at a speed of 10 km/h or under, all of the US sensors 11 to 14 arranged on the front of the vehicle are activated for detection of the nearby obstacles in the respective short ranges S1 to S4 and at the same time the front EM sensor 21 is activated for detection of the remote obstacle in the long range L1. When the vehicle is moving forward left at the above low speed, three left US sensors 11 to 13 and the front EM sensor 21 are activated. When the vehicle is moving forward right at the above low speed, three right US sensors 12 to 14 and the front EM sensor 21 are activated. The detection result is notified by the buzzer and the display in a manner as discussed in the above.

When the vehicle is moving rearward at the above low speed of 10 km/h or under, the four or three selected ones of the US sensors 15 to 18 at the rear of the vehicle are activated together with the rear EM sensor 22, depending upon the direction of the vehicle, as indicated in the flow chart.

When the monitored vehicle speed exceeds 10 km/h, the EM sensors 21 and 22 are activated for detection of the remote obstacles, while all the US sensors are deactivated. In this condition, the detection unit 30 operates to elongate an effective detection distance range L1 as the vehicle speeds increase. For example, when the vehicle speed >10 km/h and <20 km/h, the detection range L1 is limited to within 2 m from the vehicle. When the vehicle speed >=20 km/h and <50 km/h, the detection range L1 is limited to within 10 m. When the vehicle speed >=50 km/h and <100 km/h, the detection range L1 is limited to within 50 m. As the vehicle speed exceeds 100 km/h, the detection range L1 is fixed to within 100 m. Then, the vehicle direction is checked to shift directivity of the EM sensors 21 and 22 in match with an intended direction of the vehicle, either by varying the frequency of the FM signal or varying the angular orientation of the EM sensors 21 and 22. The detection of the remote obstacles by thus adjusted EM sensors is notified by the buzzer 41 and the display 42. Since the detection distance range L1 is shortened as the vehicle speed decrease, it is possible to exclude the detection of any far remote obstacle which is not dangerous to the vehicle and would otherwise cause over-sensitive warning, thereby assuring consistent and effective warning to the user sufficient for safe driving.

When moving the vehicle forward, the rear EM sensor 22 is activated to constantly detect the relative position of the remote obstacle behind the vehicle. Based upon the relative position of the obstacle behind the vehicle, the detection unit 30 acknowledges the obstacle as another vehicle approaching from behind when the position becomes closer, and cause a catching-up signal indicative of the presence of a caching-up vehicle. The catching-up signal is processed to give an alarm to the driver, for example, by generating the buzzing sound at a very short interval shorter than T1 and T2, and/or flashing all or some of the diodes. The voice message, for example, "Alert!, another vehicle rushing behind" may be also effective. For this purpose, the detection unit 30 may include a memory for storing an updated position of the remote obstacles detected behind the vehicle, and a comparator which compares the current position of the obstacle with the last position for determination of whether the obstacle is moving closer and which issues the catching-up signal when the obstacle is determined to the catching-up vehicle. The buzzer, display and/or voice speaker is connected to receive the signal to give the corresponding alert to the driver.

Further, the position of the remote obstacle detected by EM sensors may be informed by displaying its distance and direction from the vehicle in an additional LCD or by a suitable voice message, such as "12 m ahead, direction one" which means the obstacle is located ahead at a distance of 12 in a direction of one o'clock on a clock indication with zero or twelve o'clock corresponding to straight forward.

Each of the US sensors utilized in the system are selected to give a generally flat directivity with a small vertical beam angle of about 70° and a large horizontal angle of about 140° in order to eliminate unnecessary detection such as of a road surface when climbing up and down a road.

What is claimed is:

1. An obstacle detection system for a vehicle comprising:

a plurality of ultrasonic wave sensors each of which transmits an ultrasonic wave around the vehicle and receives a reflected ultrasonic wave for detecting a nearby obstacle around the vehicle;

an electromagnetic wave sensor which transmits an electromagnetic wave in a forward direction of the vehicle and receives a reflected electromagnetic wave for detecting a remote obstacle at a distance remote from the vehicle;

a vehicle speed sensor for sensing a speed of the vehicle and providing a speed output;

a detection unit which detects a presence of the nearby obstacle based upon said reflected ultrasonic wave and a presence of the remote obstacle based upon said reflected electromagnetic wave when said speed output is not more than a predetermined reference speed and detects a position of the remote obstacle relative to the vehicle only based upon said reflected electromagnetic wave when said speed output exceeds the predetermined reference speed, said detection unit issuing a nearby signal when said nearby obstacle is detected and issuing a remote signal when the position of said remote obstacle is within a predetermined distance of the vehicle; and a warning unit which provide warnings in response to each of said nearby and remote signals.

2. The system as set forth in claim 1, wherein said detection unit is configured to shorten said predetermined distance by narrowing a detection range for detection of said remote obstacle as said speed output is lowered.

3. The system as set forth in claim 1, further including a direction sensor which provides a steering wheel angle of said vehicle, said electromagnetic wave sensor varying a wave transmission direction dependent upon said steering wheel angle.

4. The system as set forth in claim 1, further including a rear electromagnetic wave sensor unit which, when the vehicle is in one of a reverse drive condition and a condition whereby the vehicle speed exceeds a predetermined speed, transmits an electromagnetic wave in a rearward direction of the vehicle and receives a reflected electromagnetic wave for detecting a remote obstacle behind the vehicle;

said detection unit processing the reflected electromagnetic wave from said rear electromagnetic wave sensor to detect a relative position of the remote obstacle behind the vehicle and to recognize the remote obstacle as another vehicle approaching from behind when the position of the remote obstacle is determined to come closer to the vehicle and issue a catching-up signal indicative of the presence of the another vehicle, and said warning unit generates a warning in response to said catching-up signal.

5. The system as set forth in claim 1, wherein said warning unit comprises a buzzer generating an intermittent buzzing sound, wherein at least one of an interval of the buzzing sound and a frequency of the buzzing sound varies according to the detection of the nearby and remote obstacles.

6. The system as set forth in claim 1, wherein said warning unit comprises a voice speaker which generates a voice message upon detection of the nearby and remote obstacles.

7. The obstacle detection system according to claim 1, further comprising a control unit that activates different ones of said plurality of ultrasonic sensors depending upon a direction of movement of the vehicle.

* * * * *